United States Patent [19]

Nakano

[11] Patent Number: 5,099,710
[45] Date of Patent: Mar. 31, 1992

[54] CONTINUOUSLY VARIABLE TRANSMISSION SYSTEM HAVING PARALLEL DRIVE PATHS WITH FLUID CONTROL VALVE INCLUDING PRESSURE EQUALIZATION

[75] Inventor: Masaki Nakano, Kawasaki, Japan

[73] Assignee: Nissan Motor Co., Ltd., Yokohama, Japan

[21] Appl. No.: 450,303

[22] Filed: Dec. 14, 1989

[30] Foreign Application Priority Data

Dec. 16, 1988 [JP] Japan .................. 63-318104

[51] Int. Cl.$^5$ ............................................. F16H 15/08
[52] U.S. Cl. ...................... 74/200; 74/196; 475/192
[58] Field of Search ............... 475/114, 115, 186, 190, 475/192, 330; 74/201, 194, 196, 868, 200; 474/29, 30, 18, 24, 35, 36

[56] References Cited

U.S. PATENT DOCUMENTS

| | | | |
|---|---|---|---|
| 1,978,439 | 10/1934 | Sharpe | 475/186 X |
| 1,985,110 | 12/1934 | Sharpe | 475/192 X |
| 2,030,203 | 2/1936 | Gove et al. | 74/200 |
| 2,045,558 | 6/1936 | Almen et al. | 74/200 |
| 2,158,047 | 5/1939 | Weston | 475/35 |
| 2,262,678 | 11/1941 | Heyer | 474/29 X |
| 2,486,524 | 11/1949 | Dulaney | 474/29 X |
| 3,430,504 | 3/1969 | Dickenbrock | 74/200 |
| 3,684,065 | 8/1972 | Scheiter | 192/3.52 |
| 4,196,641 | 4/1980 | Vogel | 474/29 X |
| 4,386,536 | 6/1983 | Kraus | 74/200 |
| 4,434,675 | 3/1984 | Kraus | 74/200 |
| 4,453,427 | 6/1984 | Kraus et al. | 74/200 |
| 4,466,312 | 8/1984 | Oguma | 74/201 X |
| 4,480,504 | 11/1984 | Ogama | 74/868 |
| 4,524,641 | 6/1985 | Greenwood | 74/691 |
| 4,526,051 | 7/1985 | Kraus | 74/868 X |
| 4,662,248 | 5/1987 | Greenwood | 74/868 X |
| 4,819,514 | 4/1989 | Yamamuro et al. | 74/868 |
| 4,846,019 | 7/1989 | Kumura | 74/864 |
| 4,885,949 | 12/1989 | Barber, Jr. | 74/193 |
| 4,909,092 | 3/1990 | Machida et al. | 74/200 |
| 4,928,542 | 5/1990 | Nakano | 74/201 X |
| 4,934,206 | 6/1990 | Nakano | 74/200 |

FOREIGN PATENT DOCUMENTS

| | | |
|---|---|---|
| 3000572 | 7/1981 | European Pat. Off. . |
| 0133330 | 2/1985 | European Pat. Off. . |
| 0207184 | 1/1987 | European Pat. Off. . |
| 581107 | 7/1933 | Fed. Rep. of Germany . |
| 2733764 | 2/1978 | Fed. Rep. of Germany . |
| 1275997 | 10/1961 | France . |
| 61-119864 | 6/1986 | Japan . |
| 62-83553 | 4/1987 | Japan . |
| 62-244724 | 10/1987 | Japan . |
| 63-34363 | 2/1988 | Japan . |
| 63-125852 | 5/1988 | Japan . |
| 63-130954 | 6/1988 | Japan . |
| 435893 | 10/1935 | United Kingdom . |
| 2018894 | 10/1979 | United Kingdom ......... 74/200 |
| 2023753 | 1/1980 | United Kingdom ......... 475/192 |
| 2161873 | 1/1986 | United Kingdom . |

Primary Examiner—Leslie A. Braun
Assistant Examiner—Khoi Q. Ta
Attorney, Agent, or Firm—Foley & Lardner

[57] ABSTRACT

A transmission system includes at least two continuously variable transmission units of a toroidal or V-belt type, arranged in parallel with each other between a common driving member and a common driven member, so as to provide parallel equal drive paths. Both units are coupled with each other so that operating conditions are equal, and connected with a single common control valve which is designed to control shift actuators of both units equally.

6 Claims, 3 Drawing Sheets

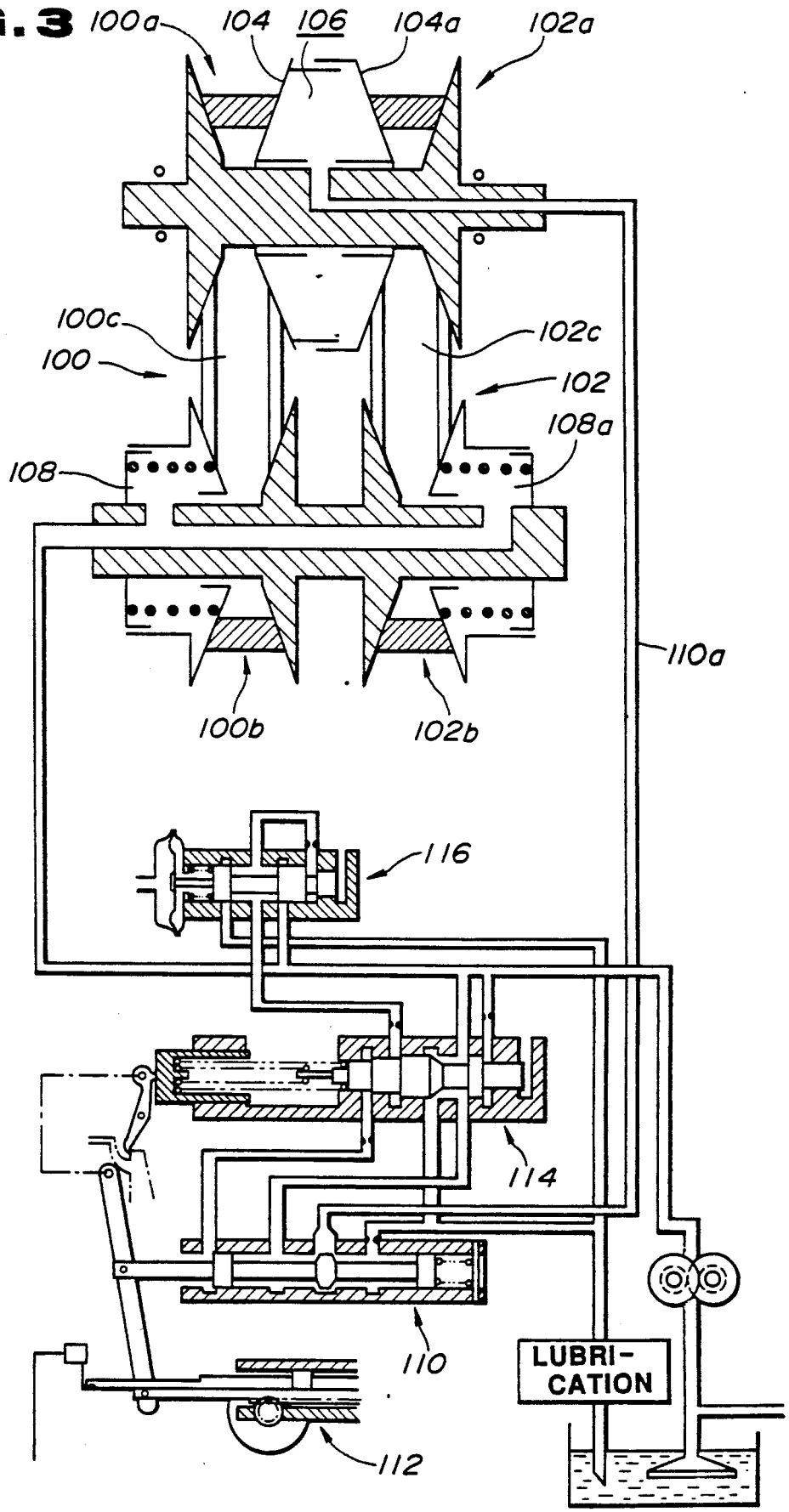

CONTINUOUSLY VARIABLE TRANSMISSION SYSTEM HAVING PARALLEL DRIVE PATHS WITH FLUID CONTROL VALVE INCLUDING PRESSURE EQUALIZATION

REFERENCES TO RELATED U.S. APPLICATIONS

The following, commonly assigned, U.S. Patent Applications relate to subject matter similar to that of the present invention. (1) Ser. No. 07/313,418, filed Feb. 22, 1989, now U.S. Pat. No. 4,928,542. (2) Ser. No. 07/314,846; filed Feb. 24, 1989, now U.S. Pat. No. 4,893,517. (3) Ser. No. 07/316,944; filed Feb. 28, 1989, now U.S. Pat. No. 4,968,289. (4) Ser. No. 07/352,309; filed May 16, 1989, now U.S. Pat. No. 4,960,004. (5) Ser. No. 07/357,192; filed May 26, 1989, now U.S. Pat. No. 4,955,246. (6) Ser. No. 07/450,326, based on Japanese Patent Application No. 63-318106, now U.S. Pat. No. 5,027,669. (7) Ser. No. 07/448,194, based on Japanese Patent Application No. 63-318107, now U.S. Pat. No. 5,052,236. (8) Ser. No. 07/476,580, based on Japanese Patent Application No. 1-82423, now U.S. Pat. No. 5,027,668.

BACKGROUND OF THE INVENTION

The present invention relates to continuously variable transmissions of various types such as a toroidal type and a V-belt type.

Japanese Patent Provisional Publication No. 63-130954 discloses a conventional toroidal type continuously variable transmission (CVT) having input and output cone discs forming a toroidal cavity therebetween, and two friction rollers which are compressed in the toroidal cavity between the input and output discs for torque transmission therebetween and which are inclined so as to continuously vary a transmission ratio of the output speed to the input speed.

Japanese Patent Provisional Publication No. 63-125852 discloses another conventional transmission system. This system has two parallel toroidal CVT units each of which has two friction rollers, and two actuators for actuating the two friction rollers, respectively. Similar toroidal type transmission systems are disclosed in the above-mentioned, commonly assigned, copending U.S. applications Ser. Nos. 07/313,418, 07/316,944 and 07/314,846, now U.S. Pat. Nos. 4,928,542, 4,968,289 and 4,893,517, respectively which are still kept in confidence.

Japanese Patent Provisional Publication Nos. 62-83553 and 63-34363 disclose V-belt type continuously variable transmission systems each having two parallel V-belt CVT units. Each of these conventional examples includes two actuators for actuating the two CVT units, respectively, and two shift control valves which are connected, respectively, with the two actuators.

However, these CVT systems having two drive units of the toroidal or V-belt type are still unsatisfactory. For example, an unbalance of torque between the two parallel CVT units readily results in an unbalance of the shift control between both units. Therefore, it is difficult to control the transmission ratio accurately. Especially the calculation of the actual speed ratio becomes more difficult as the rotational speed becomes lower (because of a lowering of the resolution).

The transmission system of the above-mentioned Japanese Publication No. 62-83553 is arranged to absorb the unbalance between the two parallel CVT units with a differential mechanism provided between both units. The addition of the differential mechanism, however, complicates the construction of the transmission system, and increases the size and weight of the system.

SUMMARY OF THE INVENTION

It is therefore an object of the present invention to provide a continuously variable transmission (CVT) system which is simple in construction, and superior in capability of equalizing operating conditions of two or more parallel CVT units.

According to the present invention, a continuously variable transmission system comprises a group of drive units, an actuating means and a controlling means.

Each of the drive units belonging to the group comprises an input member, an output member, and an intermediate member which couples the input and output members so as to transmit torque between the input and output members. Each of the drive units of the group is capable of continuously varying a speed ratio between rotational speeds of the output and input members by varying relative positions of the input, output and intermediate members relative to one another. In the case of the toroidal type, the input and output members are discs, and the intermediate members consist of at least one friction power roller. In the case of the V-belt type, the input and output members are pulleys, and the intermediate member is a V-belt.

The actuating means is connected with all of the drive units of the group for varying the relative positions of the input, output and intermediate members of all the drive units in accordance with a common control signal.

The controlling means is a means for producing the common control signal to control all of the drive units.

BRIEF DESCRIPTION OF THE DRAWINGS

FIG. 3 is a schematic view showing a V-belt type continuously variable transmission system according to a second embodiment of the present invention.

DETAILED DESCRIPTION OF THE INVENTION

Figure 1:
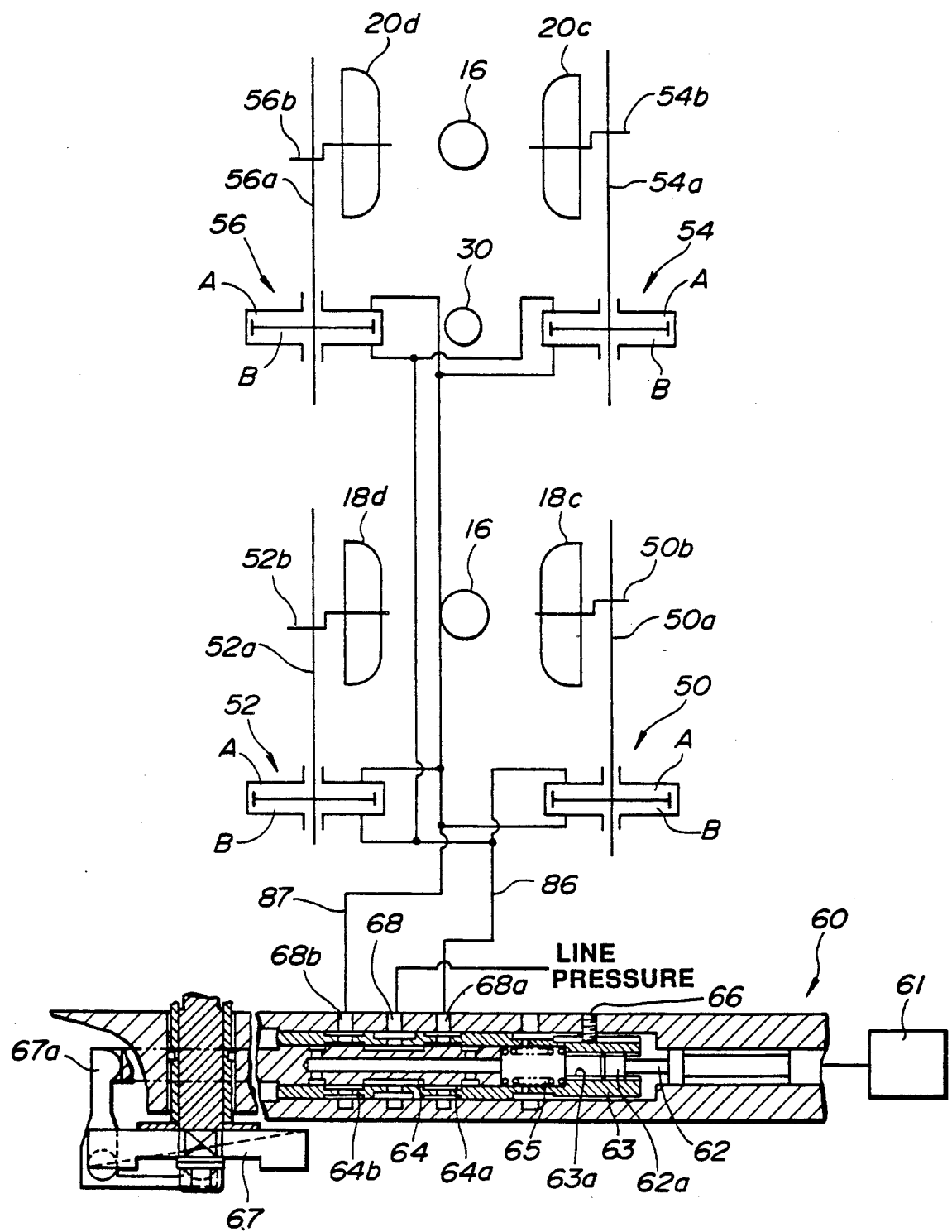
FIG. 1 is a schematic view showing a toroidal type continuously variable transmission system according to a first embodiment of the present invention.
Figure 2:
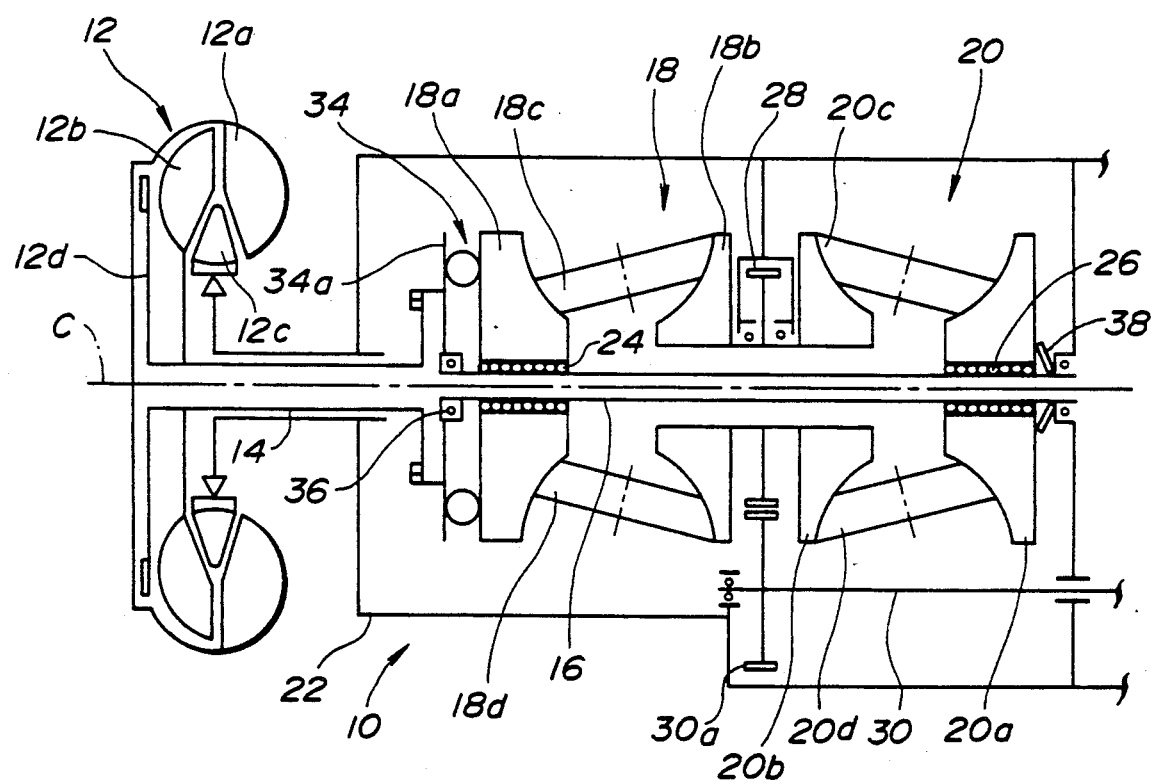
FIG. 2 is a schematic view showing two parallel drive units of the transmission system of the first embodiment.

FIGS. 1 and 2 show a first embodiment of the present invention. A continuously variable transmission (CVT) 10 of the first embodiment is a toroidal type transmission as shown in FIG. 2.

As shown in FIG. 2, the toroidal type continuously variable transmission 10 of this embodiment is connected with a torque converter 12. Power produced by a prime mover such as an engine of a vehicle is inputted through the torque converter 12 to the toroidal transmission 10.

The torque converter 12 has a pump impeller (power input member) 12a, a turbine runner (power output member) 12b and a stator (reaction member) 12c, as is well known in the art. The torque converter 12 of this embodiment is a lock up torque converter having a lock up clutch 12d to provide a direct mechanical drive. The torque converter 12 further has an output shaft 14.

The toroidal transmission 10 has two or more parallel equal torque paths. In this embodiment, the toroidal transmission 10 has a center transmission shaft 16 which is in line with the torque converter output shaft 14, and first and second drive units 18 and 20 which are arranged around the center transmission shaft 16 in axially spaced relation with each other, so as to provide two parallel equal drive paths.

The center transmission shaft 16 is a hollow shaft, and supported in such a manner that the center transmission shaft 16 is axially slidable to a limited extent with respect to a transmission housing 22.

The first and second drive units 18 and 20 are substantially identical in construction and size with each other. Each drive unit 18 or 20 has an input disc (input member) 18a or 20a, an output disc (output member) 18b or 20b, and an intermediate member coupling the input and output members for torque transmission therebetween. The input and output discs of each unit have confronting toroidal surfaces and form a toroidal cavity therebetween. Each drive unit is a friction drive transmission, and the intermediate member is a friction member which is in contact with both the input and output members. In this embodiment, the intermediate member of each drive unit consists of two friction power rollers 18c and 18d or 20c or 20d.

The first drive unit 18 is mounted on a first half of the center transmission shaft 16 between a first end and a middle of the center transmission shaft 16, and the second drive unit 20 is mounted on a second half between a second end and the middle of the center transmission shaft 16. In FIG. 2, the first end of the center shaft 16 is a lefthand end, and the second end is a righthand end.

The first output disc 18b of the first unit 18 and the second output disc 20b of the second unit 20 are disposed between the first input disc 18a of the first unit 18 and the second input disc 20a of the second unit 20. Each of the first and second drive units 18 and 20 is arranged like a mirror image of the other. In this embodiment, the input discs 18a and 20a are outside discs, and the output discs 18b and 20b are inside discs.

The first and second input discs 18a and 20a are mounted on the center transmission shaft 16 through first and second coupling means 24 and 26, respectively, in such a manner as to prevent relative rotation between the center transmission shaft 16 and each input disc, and to permit relative axial movement between the center transmission shaft 16 and each input disc. In this embodiment, each of the first and second coupling means 24 and 26 comprises ball splines having splines and balls for making the axial movement between the coupled members smooth.

An output (driven) terminal member 28 is rotatably mounted on the center transmission shaft 16 through a suitable bearing means. The output terminal member 28 of this embodiment is an output gear. The first and second output discs 18b and 20b are splined to the output gear 28. The torque transmitted from the first input disc 18a to the first output disc 18b and the torque transmitted from the second input disc 20a to the second output disc 20b are both transmitted to the output gear 28. The torque of the output gear 28 is further transmitted through a gear 30a meshing with the output gear 28 and a counter shaft 30 to an output shaft (not shown).

The toroidal transmission 10 further includes a first loading means which, in this embodiment, is a loading cam mechanism 34. The loading cam mechanism 34 is mounted on the center transmission shaft 16, at the side of the first input disc 18a. The loading cam mechanism 34 is designed to receive a torque the prime mover through the torque converter 12, and to produce an axial thrust load in accordance with the input torque.

The loading cam mechanism 34 has a loading cam disc (loading cam member) 34a which is rotatably mounted on the center transmission shaft 16 near the first lefthand end, and engaged with the center transmission shaft 16 through a thrust bearing 36. The loading cam mechanism 34 further includes loading rollers compressed between the cam disc 34a and the first input disc 18a. When the input torque is applied to the loading cam disc 34a, the cam disc 34a rotates relative to the first input disc 18a. This relative rotation causes the cam mechanism 34 to compress the loading rollers between the cam disc 34a and the first input disc 18a so as to permit torque transmission therebetween, and to produce an axial force (thrust load) pushing the first input disc 18a toward the first output disc 18b and an opposite axial force pushing an outward flange formed in the first end of the center transmission shaft 16 through the thrust bearing 36 in the opposite axial direction.

The toroidal transmission 10 further includes a second loading means which, in this embodiment, is a disc spring (Bellevile spring) 38 disposed between the second input disc 20a and the second righthand end of the center transmission shaft 16. The disc spring 38 applies an axial preload on the second input disc 20a and pushes the second input disc 20a toward the second output disc 20b.

The thrust load produced by the loading cam mechanism 34 is applied on the first input disc 18a, and at the same time, transmitted through the thrust bearing 36, the center transmission shaft 16, and the disc spring 38 to the second input disc 20a. The preload produced by the disc spring 38 is applied on the second input disc 20a, and at the same time transmitted through the center transmission shaft 16 and the cam mechanism 34 to the first input disc 18a. The thrust bearing 36, the axially slidable center transmission shaft 16, the couplings 24 and 26, and a bearing means for supporting the shaft 16 serve as a means for equalizing the thrust loads of the first and second units 18 and 20.

The two power rollers 18c and 18d or 20c and 20d of each drive unit 18 or 20 are arranged symmetrically with respect to the center axis C of the center transmission shaft 16. The power rollers of each drive unit are inclined in accordance with an operating condition such as a vehicle operating condition, and continuously vary a transmission ratio which is a ratio between speeds of the output and input discs, as disclosed in Japanese Utility Model Provisional Publication No. 63-92859.

As shown schematically in FIG. 1, the power rollers 18c, 18d, 20c and 20d are, respectively, connected with hydraulic actuators 50, 52, 54 and 56, rotating shafts 50a, 52a, 54a and 56a, and eccentric shafts 50b, 52b, 54b and 56b. In this embodiment, the first drive unit 18 is connected with a first actuator unit (means) which includes the two actuators 50 and 52, and the second drive unit 20 is connected with a second actuator unit (means) which includes the two actuators 54 and 56. Each power roller 18c, 18d, 20c or 20d is rotatably supported, through the eccentric shaft 50b, 52b, 54b or 56b, on the shaft 50a, 52a, 54a or 56a which is axially moved by the actuator 50, 52, 54 or 56. Each actuator 50, 52, 54 or 56 is capable of inclining the associated power roller 18c, 18d, 20c or 20d by causing the associated shaft 50a, 52a, 54a or 56a to move up and down. Each of the rotating shafts 50a, 52a, 54a and 56a is arranged to rotate when the associated actuator inclines the power roller by moving the rotating shaft up and down. Therefore, the angle of inclination of each power roller 18c, 18d, 20c or 20d is determined by the displacement of the associate actuator 50, 52, 54 or 56, or by the angular displacement of the rotating shaft 50a, 52a, 54a or 56a which is rotated in accordance with the up and down movement.

The toroidal transmission system further includes a single control valve 60 serving as a controlling means. The control valve 60 produces a control signal which is in the form of a control oil pressure, and delivers the control signal to each of the hydraulic actuators 50, 52, 54 and 56.

The control valve 60 has a drive rod 62 which is rotated by a step (stepping) motor 61, a sleeve 63, a spool 64 received in a bore of the sleeve 63, and a spring 65 for pushing the spool 64 in a leftward axial direction away from the motor 61, as viewed in FIG. 1.

The drive rod 62 has an externally threaded end portion 62a, which is screwed in an internally threaded hole 63a of the sleeve 63. The sleeve 63 has an axially extending groove formed in the outer circumferential surface, and a pin 66 is received in the groove of the sleeve 63, so that the sleeve 63 is axially slidable without being rotated.

A feedback arrangement is connected with the lefthand end of the spool 64, whose opposite righthand end is pushed by the spring 65. The feedback arrangement has a precess cam 67 and a link 67a. The feedback arrangement is arranged to convert a rotational displacement of one of the rotating shafts 50a, 52a, 54a and 56, into an axial displacement, through the precess cam 67 and the link 67a, and to feed back this axial displacement to the control valve 60. The amount of rotation (angular displacement) of each of the rotating shafts 50a, 52a, 54a and 56a is proportional to the amount of inclination of the associated power roller 18c, 18d, 20c or 20d. Therefore, it is possible to feed back the amount of inclination of the power roller by feeding back the amount of rotation of the rotating shaft. Similar precess cam arrangements are disclosed in a U.S. Pat. No. 4,434,675 and a copending U.S. application Ser. No. 07/352,309. The explanations about the precess cam of these documents are herein incorporated by reference.

The spool 64 has a first land 64a, and a second land 64b, which act to distribute a line pressure introduced through an input port 68 formed in a valve housing of the control valve 60, between first and second ports 68a and 68b of the valve housing, in accordance with the movement of the spool 64. FIG. 1 shows the spool 64 in a stable state in which the line pressure is equally distributed between the first and second ports 68a and 68b. As shown in FIG. 1, the input port 68 is located axially between the first and second ports 68a and 68b.

Each hydraulic actuator 50, 52, 54 or 56 has a upper fluid pressure chamber A and a lower pressure chamber B, which are separated by a piston. When a higher fluid pressure is supplied to the upper chamber A, then each hydraulic actuator 50, 52, 54 or 56 causes the corresponding rotating shaft 50a, 52a, 54a or 56a to move downward in FIG. 1. When, on the other hand, the pressure supplied to the lower chamber B is higher than the pressure of the upper chamber A, then each actuator causes the corresponding rotating shaft to move upward as viewed in FIG. 1.

The four hydraulic actuators 50, 52, 54 and 56 are connected with the control valve 60 in the following manner. The upper chambers A of the actuator 50 and 54, and the lower chambers B of the actuators 52 and 56 are all connected with the first port 68a of the control valve 60, by a first hydraulic circuit 86. On the other hand, a second hydraulic circuit 87 connects the second port 68b of the control valve 60 to the lower chambers B of the actuators 50 and 54 and the upper chambers A of the actuators 52 and 56. Between the actuators 50 and 52 for the first toroidal drive unit 18, the upper chamber A of the first actuator 50 is connected with the lower chamber B of the second actuator 52, and the lower chamber B of the first actuator 50 is connected with the upper chamber A of the second actuator 52. The actuators 54 and 56 for the second toroidal drive unit 20 are connected with each other in the same diagonal manner.

Therefore, the operating direction of the actuators 50 and 54 which are operated together in the same direction is opposite to the operating direction of the actuators 52 and 56 which are operated together in the same direction.

The thus-constructed toroidal transmission system of the first embodiment is operated in the following manner.

In the toroidal transmission 10, the first and second parallel toroidal drive units 18 and 20 transmit torque inputted from the engine through the torque converter 12 to the loading cam mechanism 34, to the output gear 28 while continuously varying the speed ratio between the output and input speeds. The output torque of the transmission 10 is transmitted through the gear 30a of the counter shaft 30, to the drive wheels of the vehicle.

During this, the axial thrust load produced by the loading cam mechanism 34 is transmitted through the center transmission shaft 16, and applied equally to the first and second input discs 18a and 20a. Therefore, the pressure compressing the power rollers 18c and 18d of the first drive unit 18 is equal to the pressure compressing the power rollers 20c and 20d of the second drive unit 20.

The first and second input discs 18a and 20a are coupled through the center transmission shaft 16 so that they rotate together. Therefore, the phase of the first input disc 18a is equal to the phase of the second input disc 20a, and the torque is transmitted without phase difference.

Thus, the first and second toroidal drive units 18a and 20 are equal in the friction condition in which the input, output and intermediate members are in contact with one another, partly because the pressures compressing the power rollers are equal, and partly because the rotational speeds of the first and second input discs are equal.

In the control valve 60, the axial position of the spool 64 is determined by the amount of rotation of the step motor 61 which is driven by an electric control signal produced by a control unit (not shown) in accordance with a vehicle operating condition, and by the amount of feedback which is returned from the power roller through the precess cam 67. In accordance with the axial position of the spool 64, the control valve 60 supplies a first control fluid pressure from the first port 68a and a second control fluid pressure from the second port 68b, to the actuators 50, 52, 54 and 56. Each of the first and second control fluid pressures is common to all the actuators 50, 52, 54 and 56.

Thus, the toroidal transmission system of this embodiment holds the first and second toroidal drive units 18 and 20 equal in condition of contact among the input, output and intermediate members, and in condition of control fluid pressure supplied to the hydraulic actuators. By so doing, the toroidal transmission system of this embodiment can make the amounts of inclination of the power rollers 18c, 18d, 20c and 20d equal to one another, and make the speed ratios of the first and second drive units 18 and 20 equal to each other.

If at least one of the power rollers 18c, 18d and 20c and 20d becomes unbalanced from some cause, the transmission system of this embodiment continues supplying the unbalanced power roller with the fluid pressure equal to the pressure of the remaining power rollers. Therefore, the transmission system of this embodiment can easily settle down the unbalanced power roller into the original stable inclined state, and prevent the drive unit from being disturbed severely.

A second embodiment of the present invention is shown in FIG. 3. In the second embodiment, the present invention is applied to a V-belt type continuously variable transmission 10a.

As shown in FIG. 3, the V-belt transmission 10a has a first V-belt drive unit 100 and a second V-belt drive unit 102, which are arranged in parallel to each other so as to provide two parallel equal drive paths. Each V-belt drive unit includes an input member 100a or 102a in the form of an input (driver) pulley, an output member 100b or 102b in the form of an output (follower or driven) pulley, and an intermediate member 100c or 102c in the form of a V-belt connecting the input and output pulleys.

The first input pulley 100a includes an axially movable inside disc 104 and an outside disc, which form a V-shaped groove therebetween. The second input pulley 102a includes an axially movable inside disc 104a and an outside disc, which form a V-shaped groove therebetween. All the discs of the first and second input pulleys 100a and 102a are arranged coaxially around an input axis, and coupled so that they rotate together. The inside discs 104 and 104a are disposed axially between the outside discs. An input cylinder chamber 106 serving as an actuator is formed between the axially movable inside discs 104 and 104a. In this embodiment, the outside discs are integral with each other, or rigidly connected by a shaft.

Each of the first and second output pulleys 100b and 102b includes inside and outside discs forming a V-shaped groove therebetween. All the discs of the first and second output pulleys 100b and 102b are arranged coaxially around an output axis, and coupled so that they rotate together. In this embodiment, the inside discs of the first and second output pulleys 100b and 102b are integral with each other or rigidly connected by a shaft. The inside discs are disposed axially between the outside discs. The first output pulley 100b has a first output cylinder chamber 108 for axially moving the outside disc of the first output pulley 100b. The second output pulley 102b has a second output cylinder chamber 108a for axially moving the outside disc of the second output pulley 102b.

The first and second output cylinder chambers 108 and 108a are fluidly connected with each other so that the same pressure (the line pressure) is applied to both chambers.

The V-belt type continuously variable transmission system of the second embodiment includes a single control valve 110 serving as a controlling means. The control valve 110 is connected with the input cylinder chamber 106 through a circuit 110a, and arranged to produce a control fluid pressure, and to send the control pressure to the input cylinder chamber 106 through the circuit 110a. In accordance with the control fluid pressure of the control valve 110, the input cylinder chamber 106 as the actuator causes the movable inside discs 104 and 104a to move axially, and continuously varies the speed ratios between the output and input pulleys of the first and second drive units 100 and 102 by varying the effective radii of the first and second input pulleys 100a and 102a.

The fluid pressure control hydraulic circuit shown in FIG. 3 further includes a shift command valve 112 including a step motor, a line pressure regulating valve 114, and a throttle valve 116, which are all known in the art, and disclosed in many patent documents. Some examples are Japanese Patent Provisional Publication No. 62-244724, and U.S. Pat. Nos. 4,819,514 and 4,846,019. The disclosures of these documents about the V-belt type continuously variable transmissions and their hydraulic circuits are herein incorporated by reference.

The control valve 110 of this embodiment is common to both the parallel V-belt CVT units 100 and 102, and arranged to hold the shift conditions of both units equal to each other.

If the movable discs 104 and 104a are axially shifted toward the outside disc of the first unit 100, then the first V-belt unit 100 is shifted toward the higher speed side, and the belt tension of the first V-belt 100c is increased because of occurrence of internally circulating torque. However, the input cylinder fluid pressure which is balanced with the transmitted torque under the condition of the same output cylinder pressure, becomes higher as the transmitted torque increases. Therefore, a downshift occurs in the first V-belt CVT unit 100 in which the oil pressure is unchanged, but the torque is increased, and an upshift occurs in the second V-belt CVT unit 102 in which the torque is decreased, so that the balance is regained at the torque balanced with the input cylinder pressure.

Thus, the CVT system of the second embodiment is arranged to hold each of the input cylinder pressure, the output cylinder pressure and the rotational phase (rotational speed) equal between the first and second units 100 and 102. By so doing, the CVT system of the second embodiment can make the contact conditions of the first and second units 100 and 102 always equal to each other, and enable the single control valve 110 to synchronize the first and second V-belts 100c and 102c.

What is claimed is:

1. A continuously variable transmission system comprising:
   first and second drive units each of which is a continuously variable transmission unit which comprises an input disc, and output disc, and an intermediate member comprising power rollers for coupling said input and output discs for torque transmission therebetween:
   actuating means connected with said first and second drive units for continuously varying a speed ratio between rotational speeds of said output and input members of each drive unit by varying positions of said input, output and intermediate members of each drive unit relative to one another, said actuating means comprising first hydraulic actuator means for actuating said first drive unit in accordance with a first control fluid pressure and second hydraulic actuator means for actuating said second drive unit in accordance with a second control fluid pressure;

a fluid pressure control valve for controlling said first and second control fluid pressures, said control valve being connected with both of said first and second hydraulic actuators by a hydraulic circuit which makes said first and second control fluid pressures equal to each other;

loading means for applying an axial force to each drive unit to compress said power rollers between said input and output discs, said loading means comprising first loading means for applying a first axial force on said input disc of said first drive unit and second loading means for applying a second axial force on said input disc of said second drive unit;

equalizing means for equalizing operating conditions of said first and second drive units by preventing relative rotational movement between said input discs of said first and second drive units and equalizing said first and second axial forces, said equalizing means comprising a center transmission shaft which is axially movable relative to a transmission housing enclosing said first and second drive units;

wherein said first loading means comprises a loading cam mechanism which transmits an input torque to said input disc of said first drive unit, produces the first axial force in accordance with the input torque, and applies the first axial force on said input disc of said first unit to push said input disc toward said output disc of said first unit, said locating cam mechanism comprises a loading cam disc which is rotatably mounted on said center transmission shaft and which is rotatable relative to said input disc of said first unit, and loading rollers which are compressed between said cam disc and said input disc of said first unit and which apply the first axial force on said input disc of said first unit in accordance with relative rotation between said cam disc and said input disc of said first unit; and wherein said input and output discs of said first and second drive units are mounted on said center shaft through coupling means which prevent relative rotational movement between said center shaft and said input disc of each of said first and second drive units and which allows relative axial movement between said center shaft and said input disc of each of said first and second drive units.

2. A continuously variable transmission system comprising:

a group of drive units each of which comprises an input member, an output member, and an intermediate member coupling said input and output members for torque transmission therebetween, and each of which is capable of continuously varying a speed ratio between rotational speeds of said output and input members by varying positions of said input, output and intermediate members relative to one another;

actuating means connected with all of said drive units of said group for varying the relative positions of said input, output and intermediate members of all of said drive units of said group in accordance with a common control signal;

controlling means for producing said common control signal to control all of said drive units of said group;

wherein said drive units are toroidal type continuously variable transmission units, said input members are input discs, said output members are output discs, and each of said intermediate members comprises power rollers, wherein said transmission system further comprises loading means for applying an axial force to each toroidal type transmission unit to compress said power rollers between said input and output discs, and equalizing means for preventing relative rotational movement among said input discs of all of said units of said group so that all of said input discs of said group rotate together, and equalizing the axial forces of all of said units of said group;

wherein said group comprises first and second drive units, said actuating means comprises first actuator means for actuating said first drive unit in accordance with a first control fluid pressure, and second actuator means for actuating said second drive unit in accordance with a second control fluid pressure, and said controlling means comprises a fluid pressure control valve, said first and second actuator means being both connected with said control valve by a hydraulic circuit which makes said first and second control fluid pressures equal to each other and which permit said control valve to control said first and second fluid pressures;

wherein said equalizing means comprises a center transmission shaft for transmitting the axial force applied on said first drive unit by said loading means, to said second drive unit, said input and output discs of said first and second drive units being mounted on said center transmission shaft;

wherein said loading means comprises first loading means provided between one of said input and output discs of said first drive unit, and said center transmission shaft, and second loading means provided between one of said input and output discs of said second drive unit and said center transmission shaft, said center transmission shaft being axially movable relative to a transmission housing enclosing said first and second drive units;

wherein said input discs of said first and second drive units are mounted on said center transmission shaft through coupling means which prevents relative rotational movement between said center shaft and said input disc of each of said first and second drive units and which allows relative axial movement between said center shaft and said input disc of each of said first and second drive units; and wherein said equalizing means further comprises a thrust bearing provided between said center shaft and one of said first and second loading means.

3. A transmission system according to claim 1 wherein said transmission system further comprises a driving terminal member coupled with said input members of all of said drive units of said group so as to transmit torque to each of said input members, and a driven terminal member coupled with said output members of all of said drive units of said group so as to receive torque from each of said output members, and all of said drive units of said group are connected in parallel to one another between said driving and driven terminal members so as to provide parallel drive paths.

4. A transmission system according to claim 3 wherein all of said drive units of said group are substantially identical in size and construction.

5. A transmission system according to claim 3 wherein said actuating means comprises hydraulic actuators each of which is connected with a unique one of said power rollers, each of said actuators having a first fluid pressure chamber, said control valve having a first output port for delivering a control fluid pressure, said first fluid chambers of said actuators being connected with said first output port of said control valve so as to receive the same control fluid pressure delivered from said first output port.

6. A transmission system according to claim 5 wherein said output discs of said first and said drive units are mounted on said center transmission shaft between said input discs of said first and second drive units.

* * * * *